United States Patent [19]

Betz et al.

[11] Patent Number: 5,388,254
[45] Date of Patent: Feb. 7, 1995

[54] METHOD AND MEANS FOR LIMITING DURATION OF INPUT/OUTPUT (I/O) REQUESTS

[75] Inventors: John F. Betz, Hyde Park; Allan S. Meritt, Poughkeepsie, both of N.Y.; Larry R. Perry, Gilroy, Calif.; William C. Shepard, Hyde Park; Harry M. Yudenfriend, Wappingers Falls, both of N.Y.

[73] Assignee: International Business Machines Corporation, Armonk, N.Y.

[21] Appl. No.: 858,905

[22] Filed: Mar. 27, 1992

[51] Int. Cl.$^6$ .................... G06F 11/00; G06F 11/30; G06F 11/34
[52] U.S. Cl. ...................... 395/575; 371/12; 371/16.3; 371/62; 364/DIG. 1; 364/265; 364/265.5
[58] Field of Search ............... 364/200, DIG. 1, 900, 364/DIG. 1; 371/12, 16.3, 62; 395/275, 575, 550

[56] References Cited

U.S. PATENT DOCUMENTS

| | | | |
|---|---|---|---|
| 3,984,814 | 10/1976 | Bailey, Jr. et al. | 395/575 |
| 4,348,722 | 9/1982 | Gunter et al. | 395/575 |
| 4,442,501 | 4/1984 | Eckert, Jr. et al. | 364/464.02 |
| 4,618,953 | 10/1986 | Daniels et al. | 371/12 |
| 4,674,035 | 6/1987 | Engel | 395/575 |
| 4,763,296 | 8/1988 | Gercekci | 395/575 |
| 4,787,041 | 11/1988 | Yount | 364/424.03 |
| 4,809,280 | 2/1989 | Shonaka | 371/62 |
| 4,837,702 | 6/1989 | Obrea | 364/466 |
| 4,879,647 | 11/1989 | Yazawa | 395/575 |
| 4,903,193 | 2/1990 | Nakamura | 395/575 |
| 5,048,017 | 9/1991 | Breneman | 371/16.3 |
| 5,065,354 | 11/1991 | Jons et al. | 395/575 |
| 5,097,470 | 3/1992 | Gihl | 371/62 |
| 5,210,867 | 5/1993 | Barlow et al. | 395/575 |
| 5,278,976 | 1/1994 | Wu | 395/575 |

Primary Examiner—Robert L. Richardson
Assistant Examiner—Lanie L. Barry
Attorney, Agent, or Firm—William B. Porter; Jeremiah G. Murray

[57] ABSTRACT

An I/O request time limit value is set in a request-based, device-based, data-set-based, or workload-based time limit field, for transactions performing I/O operations to I/O devices in a data processing system. A scan routine compares the total time for the I/O request (including waiting time and retry time) against the appropriate time limit(s), and terminates the I/O request if the time limit is exceeded. If an active I/O request is interrupted as a result of an I/O error, retry is prohibited if the total I/O request time (including retry time) exceeds the appropriate time limit, or is within a threshold value of the appropriate time limit.

9 Claims, 5 Drawing Sheets

METHOD AND MEANS FOR LIMITING DURATION OF INPUT/OUTPUT (I/O) REQUESTS

FIELD OF THE INVENTION

The invention is related to the Data Processing Systems having attached I/O devices. More particularly, it is related to transaction-oriented systems in which transaction response time is an important consideration, and in which I/O error recovery facilities are present which can delay such transactions.

BACKGROUND OF THE INVENTION

In mainframe commercial computing, recovery considerations must change when going from a batch to a transaction environment. With batch it is usually preferable to take whatever time is needed to recover. However, with on-line transactions there can be time constraints which make it better to complete a transaction, or part of a transaction, unsuccessfully but on time rather than successfully but late. An example is an on-line banking system.

Avoiding transaction delays when errors occur necessarily involves trading off full recovery actions for on time response. Where errors involve hardened data, there is potential (on a WRITE operation) for loss of data. This problem can sometimes be alleviated by duplexing of data, which many computer installations do for availability in any case. This allows abbreviated recovery actions without loss of data and so allows transactions to complete normally and on time. However, there are environments where it is preferable to return an error rather than return late.

While transaction time constraints can affect how recovery is done in every area, I/O requests are a particularly important area to address. First, I/O requests are a major component of transaction response time, and second, I/O requests are susceptible to delays due to hardware and/or software retries or other factors. For example, retry operations internal to a DASD Direct Access Storage Device control unit can take up to 4 seconds or more. Multiple software retries down multiple paths can compound this causing recovery of a DASD error to take minutes in some cases.

Some control programs (e.g., IBM's MVS/ESA) have a Missing Interrupt Handler (MIH) function which is responsible for detecting device failures and taking corrective actions to recover active I/O requests. A "fault" time limit is specified on a device basis and the MIH will interrupt an active I/O request at the device if the time limit is exceeded. The detection is accurate to ½ the fault value (on average). After the timed out I/O request is interrupted, it can often be retried. Since any software retry represents a newly active I/O request, it is allowed a full new MIH interval.

A known method for solving the problem of excessive recovery of I/O requests delaying transactions, involves an automated operations method. An automation program can be written to detect MIH console messages. The device in the message can be checked against a list of key devices, and if there is a match, the program can issue an operator command to force the device off-line. This effectively terminates all I/O requests to the device from that point on. An undesirable side effect is that the original software and/or hardware error diagnostics are lost. Also, the device was subsequently unable to process subsequent I/O requests or to return asynchronous hardware diagnostics about the original error because forcing the device off-line makes it unavailable to the system.

It is an object of the present invention to provide a mechanism for controlling the total time allowed for I/O requests.

It is a further object of this invention to track I/O request time across I/O error recovery scenarios.

It is a further object of this invention to track I/O requests across their entire "life".

It is a further object of this invention to provide for setting time limits for I/O requests on an I/O request basis, on a device basis, on a dataset basis, or on a workload (address space) basis.

It is a further object of this invention to provide for improved transaction timer accuracy over that provided in such conventional mechanisms as those used in MIH processing.

It is a further object of this invention to provide for a threshold time value beyond which I/O retries will not be attempted.

It is a further object of this invention to provide for an I/O request time limit that cannot be overridden by device recovery support code.

SUMMARY OF THE INVENTION

I/O requests are timed from when an I/O driver requests I/O initiation until the physical I/O, including all retries, is finished. The time limit can be specified in the following ways:

1. The installation can specify the I/O request time limit value on a device basis in a way similar to missing interrupt handler (MIH) timeout values today. That is, a parameter library that is scanned at system initialization time can contain the devices and their associated time intervals. In addition, operator commands to display and alter the time values can be provided by the operating system.
2. The I/O request time limit value can be specified by an I/O driver on an I/O request basis using fields in an I/O request block. In this scenario, the I/O driver has determined that the I/O request has critical timing requirements and has set those limits for a single request.
3. Since an I/O request is associated with a transaction executing in an address space, this also allows the I/O request time limit value to be specified on a workload (transaction, or address space) basis. This is based on installation policies established directly by a system administrator, or indirectly via a workload manager and can be based on a cumulative count of all I/O requests necessary to complete a single transaction.
4. I/O requests are associated with datasets through OPEN processing. A dataset identifier field in the I/O request block can be used in conjunction with a table relating dataset identifier to I/O request time limit values. This allows the I/O request time limit value to be specified on a dataset basis.

If an I/O request which is being timed takes longer than the timeout value, the request is posted with a permanent error. The timeout condition and any existing error information are recorded, and control is returned to the I/O driver. No retries will be done once the I/O request timeout condition is detected. This permits the transaction program to take an alternative action in a timely manner. Examples of alternative actions in typical environments are:

- abnormally terminating the transaction to allow subsequent transactions to complete in a timely fashion.
- going to a duplexed copy of data to attempt to complete the transaction.
- performing a default action such as instructing a machine to build a standard part when the retrieval of the customizing data was delayed.
- initiate take over recovery from hot standby machines.

DESCRIPTION OF THE PREFERRED EMBODIMENT

Figure 1:
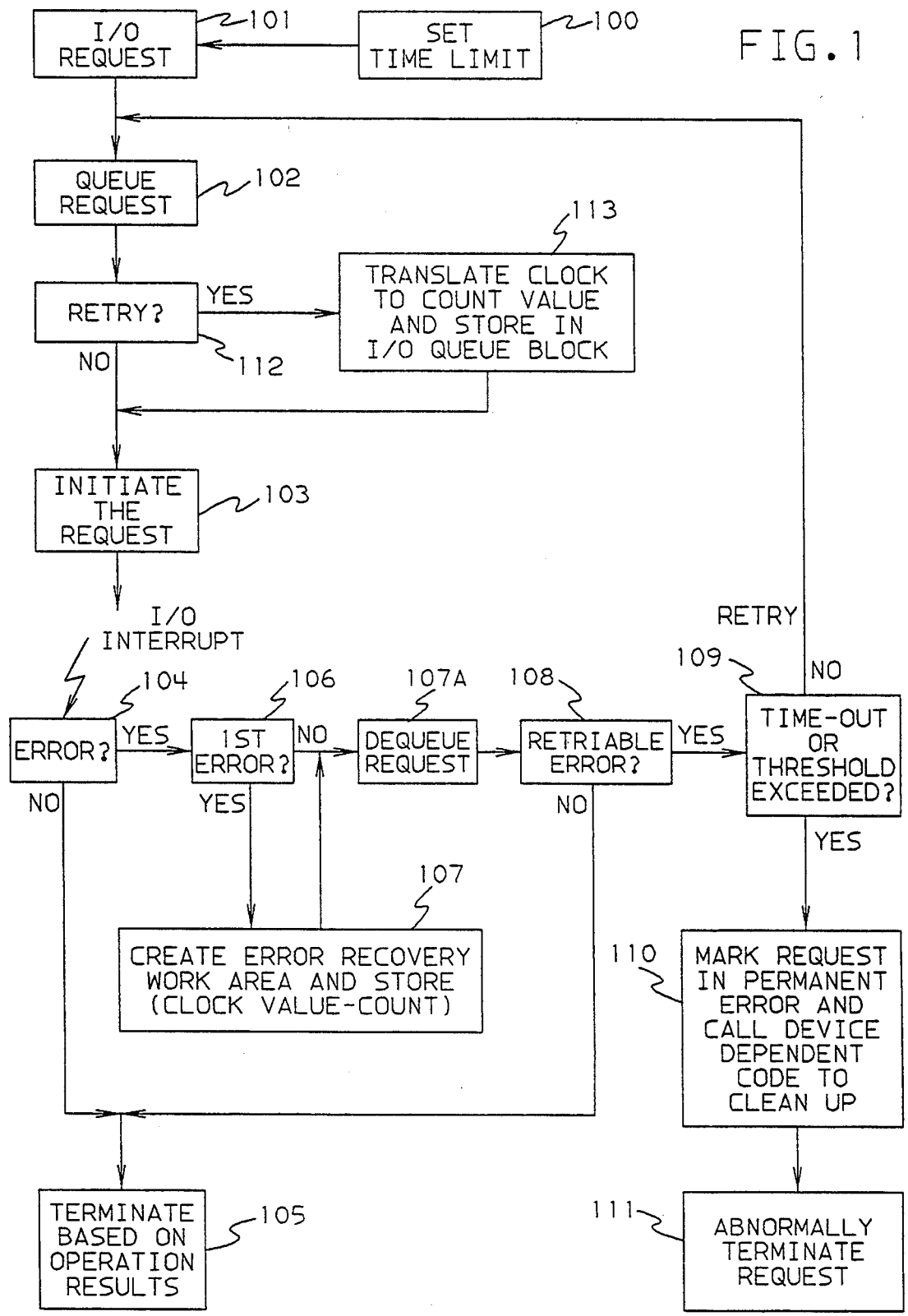
FIG. 1 is a flowchart showing control flow for the I/O process which controls I/O initiation, termination, and retry.

The timing function of the present invention is described in the preferred embodiment as operating on a device level basis. This was chosen over other mechanisms as it isolates the code associated with a timing function to the I/O supervisor. Other mechanisms are also described which involve changes by workload or database managers, access methods and any I/O driver wishing to participate in a timing environment. The environment described is that of IBM's MVS/ESA, though those skilled in the art will recognize that the techniques may be applied to other operating systems without deviating from the scope of the claimed invention.

The installation is allowed to select the devices that will be timed and their timeout values by Interval Establishment means 509, which sets an I/O request time limit (see FIG. 1 at 100 and timeout interval 301A of FIG. 3) based on a customer established time interval either with control specifications in the IECIOSxx parmlib member of SYS1.PARMLIB 305 and/or via the SETIOS operator command 508.

The parmlib member specifications enable the installation to establish I/O timing at system initialization and subsequently via the SET IOS=xx command as timing requirements change. The PARMLIB member specifications (FIG. 3 at 305) enable the installation to establish I/O timing at system initialization and subsequently via the SET IOS=xx command as timing requirements change. During system intitalization, or SET IOS=xx or SETIOS command processing, IOS parses the input data/data set (305A) to identify the I/O timing intervals, if any, which have been specified for devices. The I/O timing intervals (306A) are kept in a repository (306) (for example in MVS the MIH DEV blocks), and then the device specific blocks (301) (for example in MVS the UCB's . . . Unit Control Blocks) are updated with the timeout intervals (301A). (This technique is common and has been used for example in known Missing Interrupt Handler (MIH) parsing in MVS, in the prior art).

The SETIOS operator command allows the operations staff to add, modify or delete devices that are to be timed. In all cases, the values set are in minutes and seconds and are compared as seconds. They may be displayed using an extension of the DISPLAY operator command. (See, e.g., MVS/ESA System Commands (GC28-1626); MVS/ESA Intitialization and Tuning Guide (GC28-1634); MVS/ESA Initialization and Tuning Reference (GC28-1635)).

One stipulation is that the device must be supported by the device support code for I/O timing. This is specified by the unit information device support module (UIM) for the device. This insures that the device support code can handle the new termination code and that the device has been properly tested for I/O timing functions. If the UIM has indicated that the device supports I/O timing, the I/O timing flag (301B) in the device block (301) is set ON at system initialization.

The timer is primarily a counting mechanism. A count field in a control block that represents the I/O request is incremented at every scanning interval. When the count times the scanning interval exceeds the customer established time interval in seconds, the I/O request is terminated with an abnormal termination code that represents a permanent error. The counting mechanism was chosen over using a clock value comparison as the clock would have to be stored for every I/O request whereas the counter is only incremented on those I/O requests that are still queued. Since most I/O requests complete normally in less than the scanning interval, most I/O requests need not have a counter incremented.

The scanning interval chosen is 1 second. This means that a timeout condition can be detected within (plus or minus) 1 second of exceeding its timeout interval with an average of (plus or minus) 0.5 seconds. The interval could easily have been any interval such as 0.5 seconds or 2 seconds. One second was chosen to avoid unnecessary performance impacts and give the installation sufficient accuracy to satisfy known requirements.

There are two parallel processes occurring that affect an I/O request in a timing environment. The first process (detailed in FIG. 1) is the actual I/O path 501 in which normally the I/O request is queued, started to the device, an I/O interrupt is received and the I/O requestor is notified that is complete. This is the process that creates the necessary control blocks for a request and provides the fields needed for tracking the I/O timing process.

The second process (detailed in FIG. 2) is the scanning process 502. This process increments the count fields in the I/O queue blocks(FIG. 3 at 302A), determines if a timeout has occurred, and terminates the I/O request if it has exceeded the timeout interval.

Figure 2:
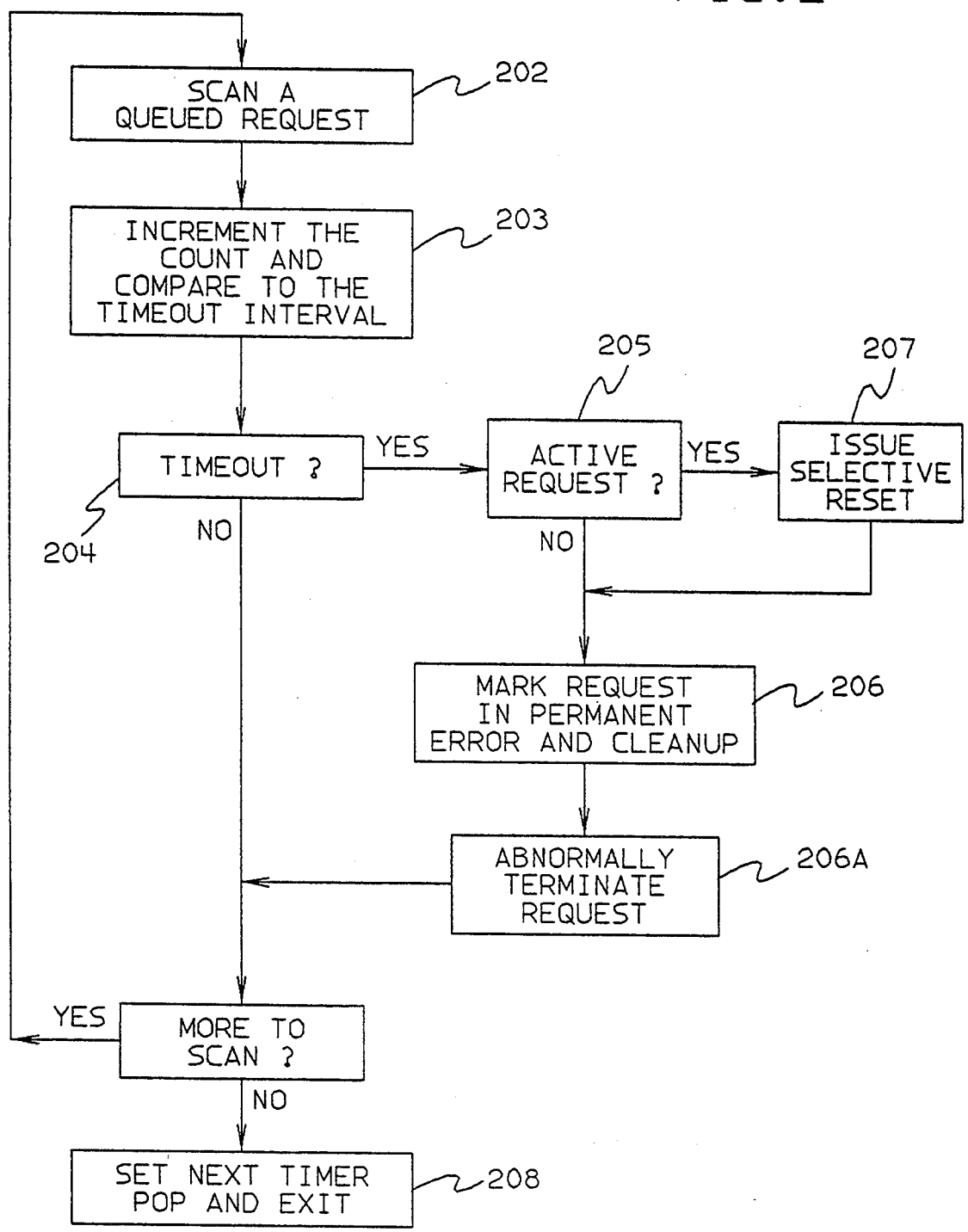
FIG. 2 is a flowchart showing control flow for the scan process which determines if a timeout has occurred.

The following description of the two key process functions—the I/O path process and the Scan process—details the processing shown in FIGS. 1 and 2. In addition, this description should be read while referring to FIG. 5, which shows the major constituent parts of the invention (some of which appear in more detail in FIGS. 1–4) and shows their relation to each other.

The I/O Path Processing for I/O Timing

After the time limit is set at 100 an I/O (503), at 101 driver issues an I/O request (on behalf of a requesting transaction executing in an address space (510) requesting I/O to a data set (511) or a device (512)) to the I/O supervisor (504), passing in an I/O request block (303) (For example, in MVS the IOSB—I/O Supervisor Block). This control block is a communication vehicle between the I/O requestor, the I/O supervisor and device support code.

At 102, the I/O supervisor creates an I/O queue block (302) that represents the I/O request and queues it to a device specific control block (301) (For example, in MVS the UCB) (An I/O request will here be called "queued" when it has an associated I/O queue block.). The I/O queue block contains information pertaining to the type of I/O request, a pointer (302B) to the I/O driver's request block (303) and the I/O timing count field (302A). The device specific control block contains device information such as whether the device supports I/O timing (301B), the I/O timeout interval (301A) (or a similiar mechanism for obtaining the interval), and provides the anchor (301C) for all I/O requests to be issued to that device.

If there is some reason that the I/O request cannot be started such as an already active I/O request to the device, the I/O request is left queued. A test is made 112 for a retry operation (The retry process is described below). Otherwise, the I/O request is initiated 103 via the processor start I/O instruction.

Once the I/O operation completes, an error detection means (570) interrogates the status (505) of the interrupt 104 to determine if an error has occurred. If no error occurred (105), then the operation is complete and timing is no longer needed for that I/O request.

If an error has occurred, and this is the first error for the I/O request (Y path from 106), an error recovery work area (304) is created to serve as a communication interface between the I/O supervisor and device dependent code that will determine if the error is recoverable. Since the I/O queue block is no longer needed, it is discarded and ties between the I/O request block and the device block are severed.

However, a loose approximation of the original start time needs to be retained and is preserved by storing the current clock value and subtracting the count from it 107 (304A). This value is stored as a clock value to facilitate the "timeout" test at 109 . . . because the scanning routine has no means of obtaining addressability to the error recovery work area, it could not mark the passage of time by incrementing any value in the error recovery work area.

Note that it is possible that this I/O request was already an instance of a retry (N path from 106). If this is the case, then the error recovery work area already exists and need not be recreated. Further, the clock value need not be recalculated as this would cause loss of clock accuracy when error retries occur in sub-seconds. (For example, if the scan routine were to run at a time when the I/O request is neither queued nor active (i.e., between 107A and 102 on the retry path), the passage of 1 second of time would not otherwise be marked for this I/O request . . . but see below for this case).

Once it has been determined that an error has occurred, then device dependent code is called to determine if the error is recoverable 108. If the device dependent recovery code (506) determines that the error cannot be recovered (N path from 108) the I/O request is terminated with a permanent error (105) and timing is complete. On the other hand, if a retry (507) is to be attempted (Y path from 108), then the start clock value in the error recovery work area is compared against the current clock time 109. If the timeout interval is exceeded or the threshold (a percentage of the timeout interval) is exceeded (See "Timeout Interval Support", below), then the retry is not allowed (Y path from 109) and the error is marked with a timeout condition as a permanent error and control is returned to the device dependent code 110. When the device dependent code receives control for the timeout, it must check for an I/O timing timeout. If there is a timeout, the device dependent code must never retry but must log the original I/O error, clean up its resources, and return control to the I/O supervisor 111 with an indication that the time limit has been exceeded (513). This ensures that software and/or hardware error diagnostics are preserved for the original error.

If there is no timeout (N path from 109), the retry is allowed.

If a retry (507) is attempted, then a new I/O queue block is created 102 and the clock value in the error recovery work area is translated back to a count value 112,113 in the I/O queue block to be incremented by the normal scanning processing. (The translation is performed by subtracting the value in the error recovery work area from the current clock value, and rounding this result to the nearest integer. This will be the current "count". Note that the initial count value is zero. Therefore the count is, in general, the total number of timer pops thus far, except that a timer pop while an I/O queue block is not accessible (between 107A and 102 in FIG. 1) would not be accounted for except for the translation of step 113—which effectively adds to the original count the rounded time value between the first error and the present time, and stores this value as the count. This is the method used in the preferred embodiment to account for the passage of time including time spent in retry processing.

Timeout Interval Support: To support timeout intervals on a request, device, data set, or workload basis, the following procedure is followed:

If the device block (301) indicates that the device supports I/O timing (301B), then the I/O request block (303) is checked for timeout intervals. The interval source flags (303D) indicate which, if any, of the I/O timing fields in the I/O request block are to be used to obtain timeout intervals. If the request-based flag is ON then the timeout interval (303A) in the I/O request block is added to a temporary list of timeout intervals. If the data-set-based flag is ON, the data set ID (303B) is used as an index to look up the associated timeout interval (307A) in the data set time interval table (307). This timeout value is then added to the list of timeout intervals. (The data set time interval table is initialized at system initialization with timeout values supplied by the system administrator. The data set ID is associated with the application at data set OPEN time. The access method ensures that all subsequent I/O requests for that dataset contain the data set ID. (The association of a data set ID with an I/O request is commonly known and is used, for example, for I/O PURGE processing in MVS.))

If the workload-based flag is ON then the address space ID (303C) is used as an index to look up the timeout interval (308A) in the address space time interval table (308). This timeout value is then added to the list of timeout intervals. (The address space time interval table is initialized at system initialization with timeout intervals for various jobs, TSO userids, etc., supplied by the system administrator. The access method ensures that all I/O requests contain the address space ID. (The association of an address space ID with an I/O request is commonly known, and is used, for example, by the I/O supervisor (IOS) in MVS.))

Finally, if there is a timeout interval (301A) set for this device in the device specific block (301), this value is also added to the list of timeout intervals. The list is then scanned for the smallest timeout value, which is the timeout value then tested against at 109 in FIG. 1, and by the scanning process (FIG. 2 at 204).

The Scanning Process

A scanning process (502) is triggered by a timer event (201) set according to the length of the scanning interval. In this embodiment, the interval is set at 1 second.

At each scan, the count field (302A) in all I/O queue blocks (302) is incremented (FIG. 2 at 203). The count field is then compared against the timeout interval associated with the device it is anchored to (301A).

If a timeout occurs for a queued request that has not been started (Y path from 204, N path from 205), then the I/O request block is marked with a timeout condition as a permanent error (206), control given to device dependent code to cleanup and the I/O request is returned to the requestor(206A).

If a timeout occurs for an I/O request that has been started (Y path from 204, Y path from 205), then a selective reset is issued to the device (207) to terminate the active I/O request in progress. Once the selective reset is complete, the i/O request is returned (206) as in the case of I/O requests that were not yet started.

Once all I/O requests have been scanned, a new timer is set (208) for exactly one second after the current scan.

Figure 3:
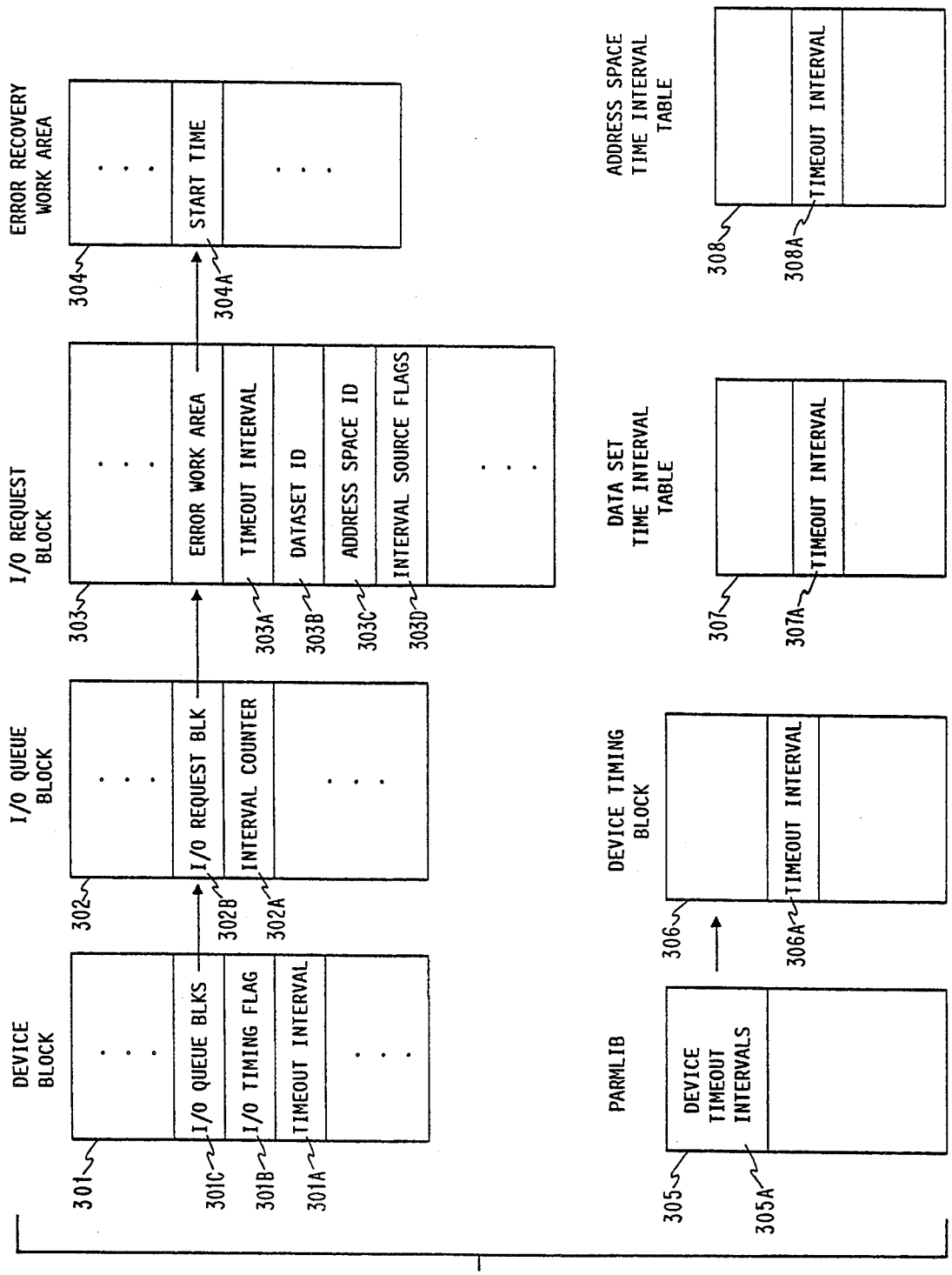
FIG. 3 is a control block diagram illustrating the key control blocks used in the present invention—Device Block; I/O Queue Block; I/O Request Block; Error Work Block, PARMLIB, device timing block, data set time interval table, and address space time interval table.

With regard to the control blocks shown in FIG. 3, note that the control block structure shown represents the structure when an I/O request has been queued. The error work area (304) is only present after an error has been detected. Once an interrupt occurs, the I/O queue block (302) is deleted and the link between the device block and the I/O request block is broken. This causes the need for saving a start time in the error work area.

I/O Timing Example.

Figure 4:
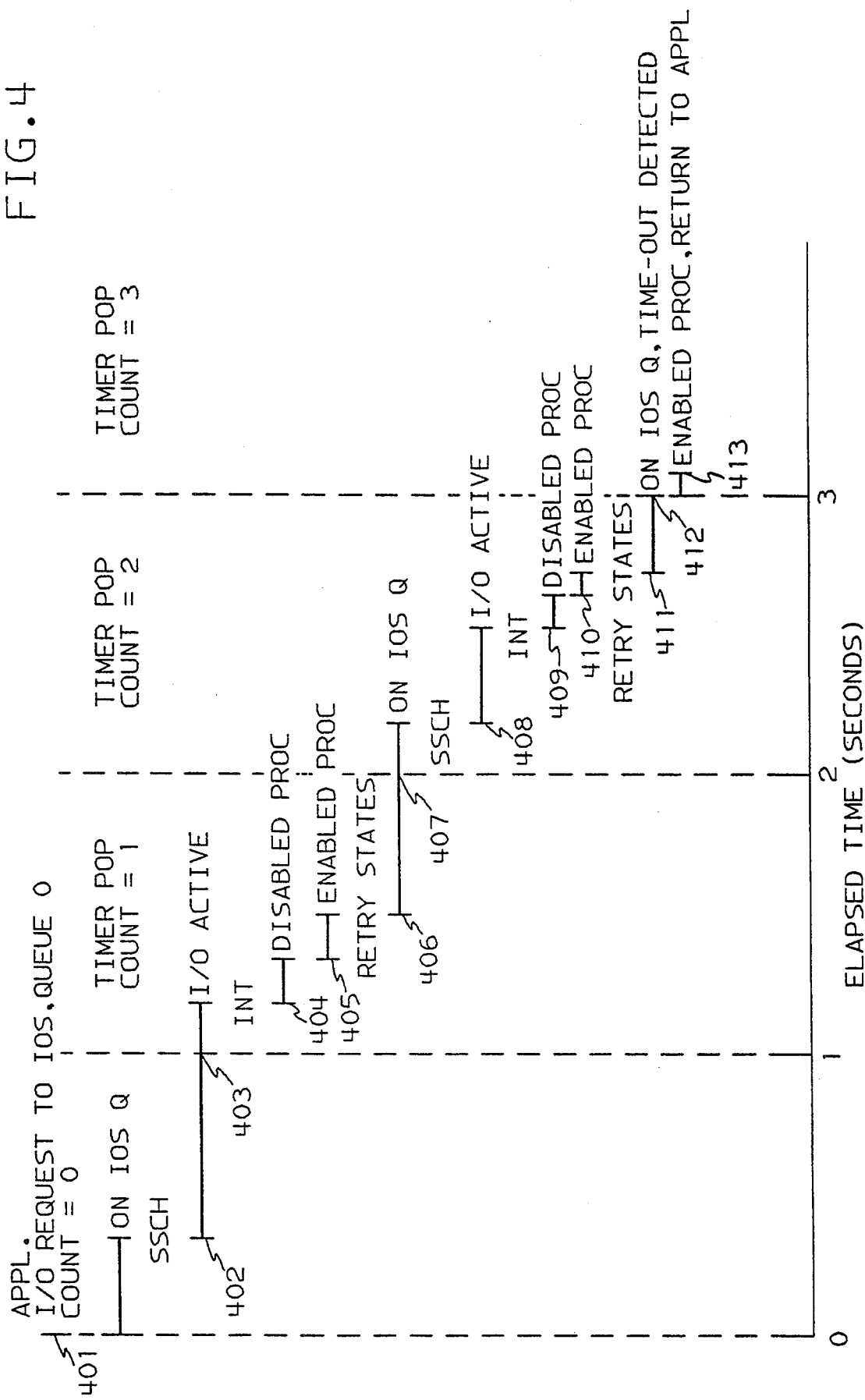
FIG. 4 is a time line chart illustrating an I/O timing timeout process with a timeout interval of 3 seconds.
Figure 5:
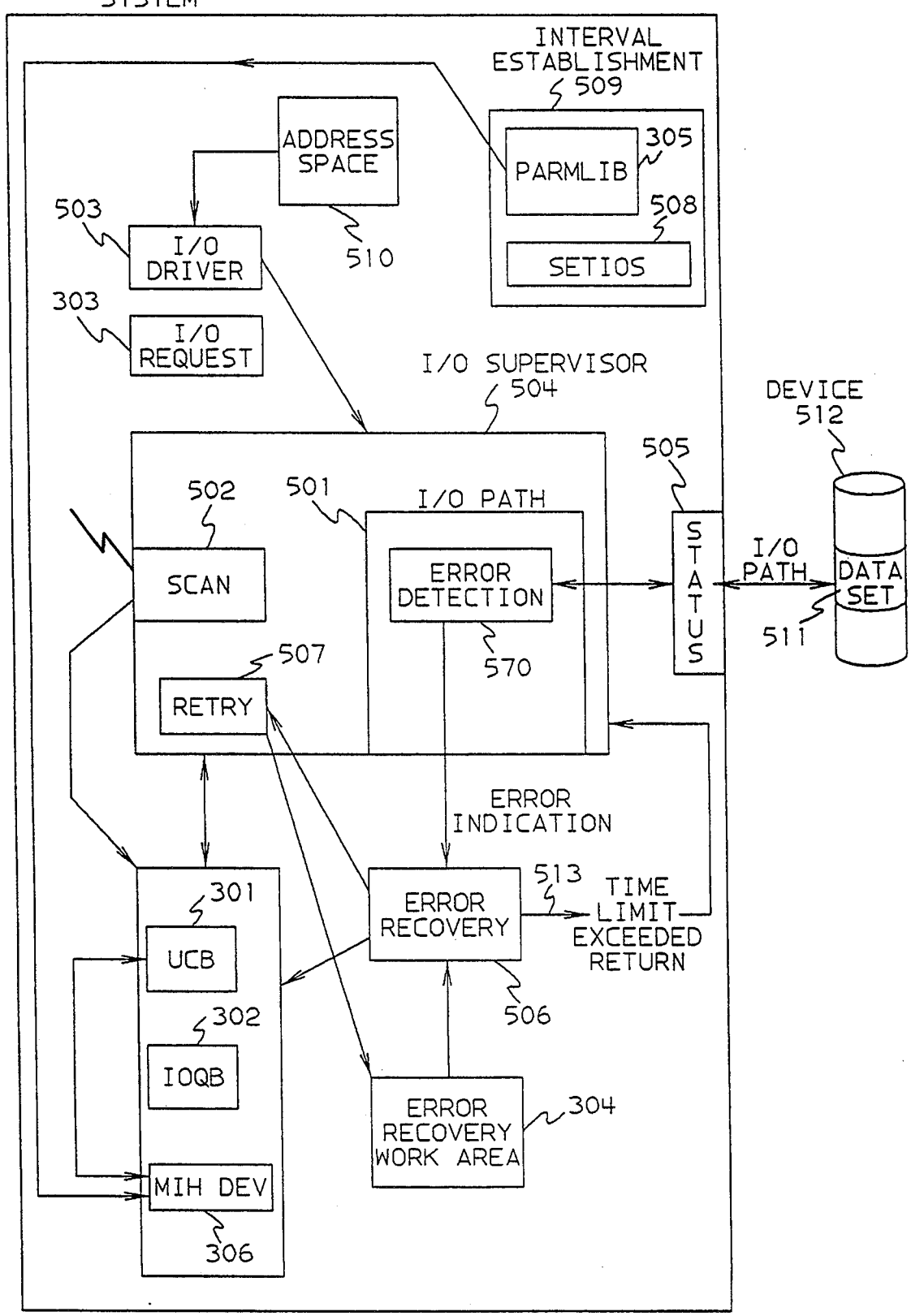
FIG. 5 is a system structure diagram showing the constituent elements of the preferred embodiment.

The following is an example of an I/O timing timeout according to the present invention, for a timeout value of 3 seconds (for simplicity, the test is for a total time "greater than or equal to" 3 seconds, though the "greater than" test could as easily have been illustrated):

Referring to FIG. 4, an MVS application passes an I/O request to IOS. IOS queues the I/O request 401 and sets the I/O timing count to zero. After some time on the IOS queue, IOS issues the START I/O instruction 402 and the I/O request becomes active. The I/O request processing has been delayed (either due to long IOS queue time, or long I/O active time, or both), so the first timer pop occurs 403 while the I/O request is still active. Since the timeout value is not yet reached, the I/O request is allowed to continue. The I/O interrupt occurs 404 (conventionally) indicating I/O request completion). Disabled and enabled processing 405 occur and an error is detected. During enabled processing, a clock value equal to the current clock value minus the count of 1 is stored in the error recovery work area (FIG. 3 at 304) and the device dependent code is called. The device dependent code determines that the error is retriable. Since the timeout value has not been reached, the retry is permitted. The I/O request is queued 406 and the error recovery work area clock value is converted to a count of 1. While the I/O request is on the IOS queue, the second timer pop occurs 407 and the count is incremented to 2. Since the timeout value is not yet reached, the I/O request remains queued. The I/O request is then started 408 and later the I/O interrupt occurs 409. During disabled processing and enabled processing 410 an error is again detected. Since this is not the first error the previous clock value remains in the error recovery work area. The device dependent code again determines the error to be retriable. Since, again the timeout value has not been reached, the retry is permitted. The I/O request is queued 411 and the error recovery work area clock value is converted to a count of 2. The third timer pop occurs 412 and the count is incremented to 3. Since the timeout value of 3 has been reached, the I/O request is dequeued and marked in permanent error. Enabled interrupt processing is given control, during which the device dependent code is called to log the error and cleanup its resources. Finally control is returned to the application 413.

The invention claimed is:

1. An apparatus for limiting duration of an I/O (input/output) request performed by an I/O supervisor to a data set resident in an I/O device in a data processing system comprising a main processor having a processor clock and said I/O device attached to said main processor, said apparatus comprising:

a) request-based interval establishment means for setting an I/O request time limit in a request time limit field located in said data processing system, and turning ON a request limit indicator in a request limit indicator field located in said data processing system, for said I/O request;

b) data-set-based interval establishment means for setting a maximum data-set duration for said I/O request to said data-set in a data-set-based time limit field located in said data processing system, and turning ON a data-set limit indicator in a data-set indicator field located in said data processing system, for said I/O request;

c) workload-based interval establishment means for setting a maximum workload duration for said I/O request originating in an indicated address space in a workload-based time limit field located in said data processing system, and turning ON a workload limit indicator in a workload indicator field located in said data processing system, for said I/O request;

d) device-based interval establishment means for setting a maximum I/O duration for said I/O request to said I/O device in a device-based time limit field located in said data processing system, and turning ON a device limit indicator in a device indicator field located in said data processing system, for said I/O request;

e) error detection means for detecting an I/O error for said I/O device and generating an error indication;

f) error recovery means, responsive to said error indication for calculating said total I/O request time value for said I/O request, for comparing said total I/O request time value, calculated by said error recovery means, to a minimum of said I/O request time limit, said maximum data-set duration, said maximum workload duration, and said maximum device duration, and for restarting said I/O request only if said total I/O request time value for said I/O request is less than a minimum of said I/O request time limit, said maximum data-set duration, said maximum workload duration, and said maximum device duration, said time limit and durations being considered in deriving said minimum only if said request, data-set, workload, and device indicators are ON, respectively, said total I/O request time value being calculated by said error recovery means with respect to an initial start time for said I/O request;

g) scan means for calculating said total I/O request time value, for comparing said total I/O request time value, calculated by said scan means, to a minimum of said I/O request time limit and said maximum data-set duration, and for terminating said I/O request, if said total I/O request time value, calculated by said scan means, is greater than a minimum of said I/O request time limit and said maximum data-set duration, said maximum workload duration, and said maximum device duration time limit and durations being considered in deriving said minimum only if said request, data-set, workload, and device indicators are ON, respectively.

2. An apparatus for limiting duration of an I/O (input/output) request performed by an I/O supervisor to a data set resident in an I/O device in a data processing system comprising a main processor having a processor clock and said I/O device attached to said main processor, said apparatus comprising:

a) interval establishment means for setting a time limit in a time limit field located in said data processing system for said I/O request;

b) error detection means for detecting an I/O error for said I/O device and generating an error indication;

c) error recovery means, responsive to said error indication, for restarting said I/O request only if a total I/O request time value for said I/O request is less than said time limit, said error recovery means comprising first I/O request time approximation means for estimating said total I/O request time value including error recovery time and comparing said estimated I/O request time value to said time limit;

d) scan means for terminating said I/O request, if said total I/O request time value is greater than said time limit, said scan means comprising second I/O request time approximation means for estimating said total I/O request time value including error recovery time and comparing said estimated I/O request time value to said time limit.

3. The apparatus of claim 2 in which said first I/O request time approximation means comprises:

a) start time approximation calculation means for calculating an approximation of an initial start time for said I/O request, and storing said approximation in an error recovery work area, and b) timeout check means for determining if said total I/O request time value is less than said time limit by calculating a first difference between said approximation and a current clock value, and comparing said first difference with said time limit.

4. The apparatus of claim 3 in which said first I/O request time approximation means further comprises means for restarting said I/O request if said first difference is less than a threshold value, said threshold value being a percentage of said time limit.

5. The apparatus of claim 4 in which said first I/O request time approximation means further comprises means for returning a "time limit exceeded" indication to an issuer of said I/O request if said total I/O request time value is greater than said time limit or said first difference is greater than said threshold value.

6. The apparatus of claim 2 in which said time limit specifies a maximum I/O request duration for any I/O request to said I/O device.

7. The apparatus of claim 2 in which said time limit specifies a maximum I/O request duration for any I/O request to said data set.

8. The apparatus of claim 2 in which said I/O request originates in an address space and in which said time limit specifies a maximum I/O request duration for any I/O request originating in said address space.

9. The apparatus of claim 2 in which said time limit specifies a maximum I/O request duration for said I/O request.

* * * * *